Jan. 19. 1932.　　U. TERZOLI　　1,841,857
BLOCKING DEVICE FOR CABLES
Filed July 17, 1929
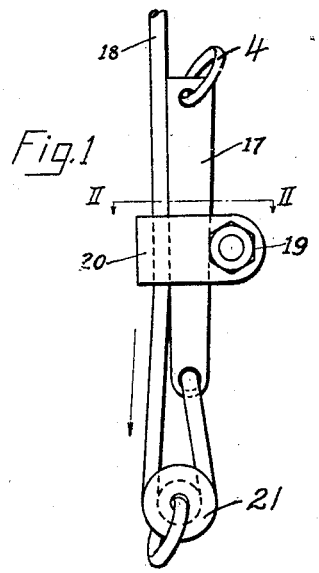
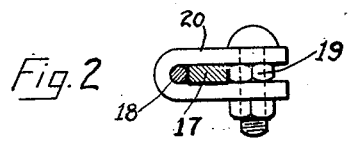
UMBERTO TERZOLI
INVENTOR.
BY
ATTORNEYS.

Patented Jan. 19, 1932

1,841,857

UNITED STATES PATENT OFFICE

UMBERTO TERZOLI, OF ROME, ITALY

BLOCKING DEVICE FOR CABLES

Application filed July 17, 1929, Serial No. 379,042, and in Italy July 17, 1928.

The object of the invention is a blocking or gripping device for cables put under tension. According to the invention this device comprises substantially a metal box which is traversed by the cable and wherein the cable is blocked or gripped by one or more members interposed between the cable and the box. The said members are preferably constructed so as to have one inclined plane and thus block the cable by aid of a wedging action, or they may also be in the shape of a parallelopipedon and be pressed against the cable by screws carried by the box, or in the shape of a nut or have other suitable shape.

Figure 1 is a side elevational view of the invention, and

Figure 2 is a cross sectional view taken on the line II—II looking in the direction of the arrows.

Referring to the figures the cable is shown at 18 and it passes through the box 20 around the pulley 21 and is then fastened by any desired means to the lower edge of the wedge 17. The wedge 17 has a loop 4 secured thereto to which a tackle or other device may be attached so as to place the cable under tension. In the arrangement shown when the tackle or the like ceases acting upon the loop and the cable tends to slip back in the direction of the arrow, such movement will be prevented due to the wedge 17 being forced against the cable 18 by the side of a nut 19 which extends through the box 20 in the manner shown. The side of the nut 19 is disposed at any suitable inclination so as to coact with the inclined face of the wedge 17. It is of course obvious that the inclination of the side of the nut 19 may be placed at any predetermined inclination so as to secure an action with the wedge at substantially any point along the inclined face of the wedge.

From the description above the operation of the device is obvious.

What I claim is:

A gripping or blocking device for cables under tension comprising a metal box, means within said box to grip the cable when the tensioning strain is loosened upon said cable, said gripping means including a flat sided nut.

In testimony whereof I have signed my name to this specification.

UMBERTO TERZOLI.